US006918190B2

(12) United States Patent
Choquet

(10) Patent No.: US 6,918,190 B2
(45) Date of Patent: Jul. 19, 2005

(54) MECHANISM FOR SIMULTANEOUSLY ADJUSTING THE STEP SUPPORT ANGLES OF A STRAIGHT STAIRCASE

(76) Inventor: Bernard Choquet, 99 Chemin de Mimet, 13015 Marseilles (FR)

( * ) Notice: Subject to any disclaimer, the term of this patent is extended or adjusted under 35 U.S.C. 154(b) by 0 days.

(21) Appl. No.: 10/472,979

(22) PCT Filed: Mar. 27, 2002

(86) PCT No.: PCT/FR02/01075

§ 371 (c)(1),
(2), (4) Date: Jun. 8, 2004

(87) PCT Pub. No.: WO02/077394

PCT Pub. Date: Oct. 3, 2002

(65) Prior Publication Data

US 2004/0216542 A1 Nov. 4, 2004

(30) Foreign Application Priority Data

Mar. 28, 2001 (FR) .......................................... 01 04147

(51) Int. Cl.[7] .............................................. G01D 21/00

(52) U.S. Cl. ........................... 33/645; 33/664; 33/415; 52/183

(58) Field of Search ......................... 33/645, 664, 562, 33/473, 452, 465, 471, 415–417, 613, 518, 558.05, 558.08, 558.1; 52/182–183

(56) References Cited

U.S. PATENT DOCUMENTS

| | | | | |
|---|---|---|---|---|
| 2,212,331 A | * | 8/1940 | Tracy | 33/417 |
| 3,250,014 A | * | 5/1966 | Watson | 33/664 |
| 5,461,798 A | * | 10/1995 | Ribeiro | 33/562 |

* cited by examiner

*Primary Examiner*—Christopher W. Fulton
*Assistant Examiner*—Tania C. Courson
(74) *Attorney, Agent, or Firm*—Darby & Darby

(57) ABSTRACT

A mechanism for simultaneous angle adjustment of support elements (4), particularly for setting up a mold structure for the steps of a straight staircase, has a casing (9) in which at least two interdependent shafts (6) are arranged. Each of the shafts (6) extends into the next shaft in a nested configuration where the successive intervals between the shafts are adjustable. Each shaft has a threaded portion (6*a*) traversing an internally threaded block (11) that is located in the casing and holds one of the support elements (4). A shaft (12), running parallel to the two or more shafts (6), passes through the blocks and is equipped with eccentrics (13), where each of the eccentrics (13) is respectively associated with one of the blocks (11). The eccentrics are constrained to share the rotation of the shaft (12), and the eccentric of each block interacts with the respective support element that is associated with that block, so that by pushing against the support element, the eccentric sets the support element to a predetermined slope angle (A).

5 Claims, 4 Drawing Sheets

MECHANISM FOR SIMULTANEOUSLY ADJUSTING THE STEP SUPPORT ANGLES OF A STRAIGHT STAIRCASE

This application is a national phase application under 35 U.S.C. § 371 of International Application No. PCT/FR02/0175, filed Mar. 27, 2002, which claims priority to French Application No. FR-0104147, filed Mar. 28, 2001 and is incorporated herein in its entirety.

BACKGROUND OF THE INVENTION

The present invention relates to a mechanism for simultaneously adjusting step support angles for the purpose of realizing a mold structure for a straight staircase.

The mechanism is of the type that includes a casing, inside of which at least two interdependent shafts are arranged in a nested configuration so that each shaft extends into the next shaft, wherein the successive intervals between the shafts are adjustable, and wherein each shaft has a threaded portion traversing an internally threaded block that is seated in the casing and holds a stair-step support.

Until now, the procedures for building mold structures for straight stairs have remained at the pre-industrial level. One starts by tracing the vertical line of each riser on the sidewalls. Next, strips of lumber are put in place on the tracing by means of nails or pins, and subsequently, the molds for the risers are attached to the lumber strips.

To make these molds is a time-consuming and therefore expensive process and requires specialized labor, without providing assurance of the quality and precision required.

To improve the technique, the U.S. Pat. No. 2,883,759 proposes a stair mold arrangement in which the mold boards are supported by a structure that extends above the staircase that is to be built.

The boards are held by arms or suspension elements that are movable and adjustable along the axis of the structure, and thus along the axis of the staircase. The arms are guided in two parallel glide rails, and a scissors mechanism allows all of the suspension arms carrying the mold boards to be moved together, whereby the interval between the support arms is automatically adjusted.

Unfortunately, an arrangement of this kind is very fragile, and the rapid wear on the scissors joints will lead to an amount of play that is incompatible with the desired level of precision.

Furthermore, the members of the scissors are often bent accidentally, which causes malfunctions that are further aggravated by the fouling of the mechanism from splashed concrete.

Moreover, a molding arrangement for a straight staircase is described in DE 1 934 586, which is designed to allow the spacing of the steps by means of a casing containing a plurality of shafts that are interdependent and can be nested, where the successive intervals between them can be adjusted. To accomplish this, each shaft has a threaded portion running through a block that is located in the casing.

With arrangements of this kind, it is not possible to arbitrarily vary the angles of the supports that determine the position of the risers (these angles vary as a function of the depth of each horizontal tread and of the height of each riser). Thus, these devices do not offer the possibility to produce any desired step configuration of a straight staircase, and they are limited by the fact that the height and depth of the steps can only be varied together, so that the use of these devices is limited to certain step configurations.

OBJECT OF THE INVENTION

The object of the invention is to propose a device which, in addition to the setting of variable intervals between the shafts, also allows a variable setting for the angles of the tread supports, thereby making it possible to produce all types of staircases by means of the same device.

SUMMARY OF THE INVENTION

According to the invention, the mechanism for simultaneously adjusting the support angles in the step configuration for setting up a mold structure for a straight staircase has a shaft that runs parallel to the at least two aforementioned shafts that serve to adjust the spacing. The parallel shaft passes through the blocks and is equipped with eccentrics, each of which is associated with one of the blocks. The eccentrics are constrained to share the rotation of the parallel shaft, and each eccentric interacts with a support element that is associated with the same block, so that by pushing against the support element, the eccentric sets the support element to a predetermined slope angle.

A mechanism of this kind is useful for a multitude of applications, particularly for configuring the steps of straight staircases, mechanisms for feed distribution in agriculture, etc.

According to one characteristic of the invention, the shaft passes through the entire set of eccentrics and is profiled so that the eccentrics are taken along by a rotation of the shaft and each eccentric will turn in its respective block, driven by an actuating means that is provided at one end of the shaft.

BRIEF DESCRIPTION OF THE DRAWINGS

Other features and benefits of the invention will become evident from the following description which refers to a preferred embodiment illustrated in the attached drawings, wherein.

DETAILED DESCRIPTION OF PREFERRED EMBODIMENTS

Figure 1:
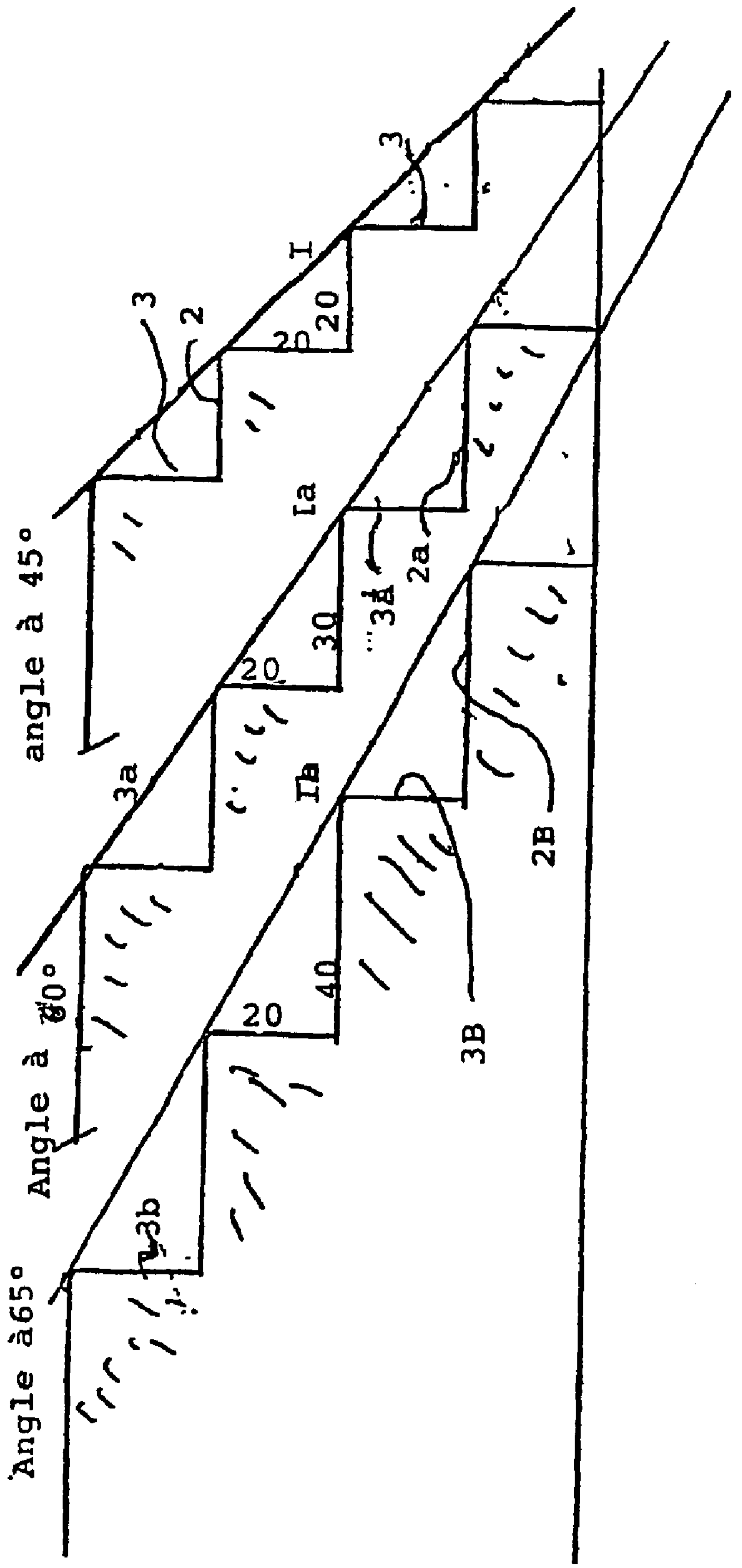
FIG. 1 schematically illustrates several straight staircases with different slope angles shown in a side view.

Three straight staircases 1, 1*a*, 1*b* are shown in FIG. 1, with their respective horizontal treads 2, 2*a*, 2*b* and their respective risers 3, 3*a*, 3*b*, with the stair strings extending along the planes I, Ia, Ib, respectively. These planes have respective slope gradients A, A1, A2 relative to the horizontal, depending on the height of the risers and the depth of the horizontal treads. Step supports can be arranged on the stair strings in appropriately inclined positions for setting up a mold structure that is known per se and is not shown in the drawing.

Figure 2:
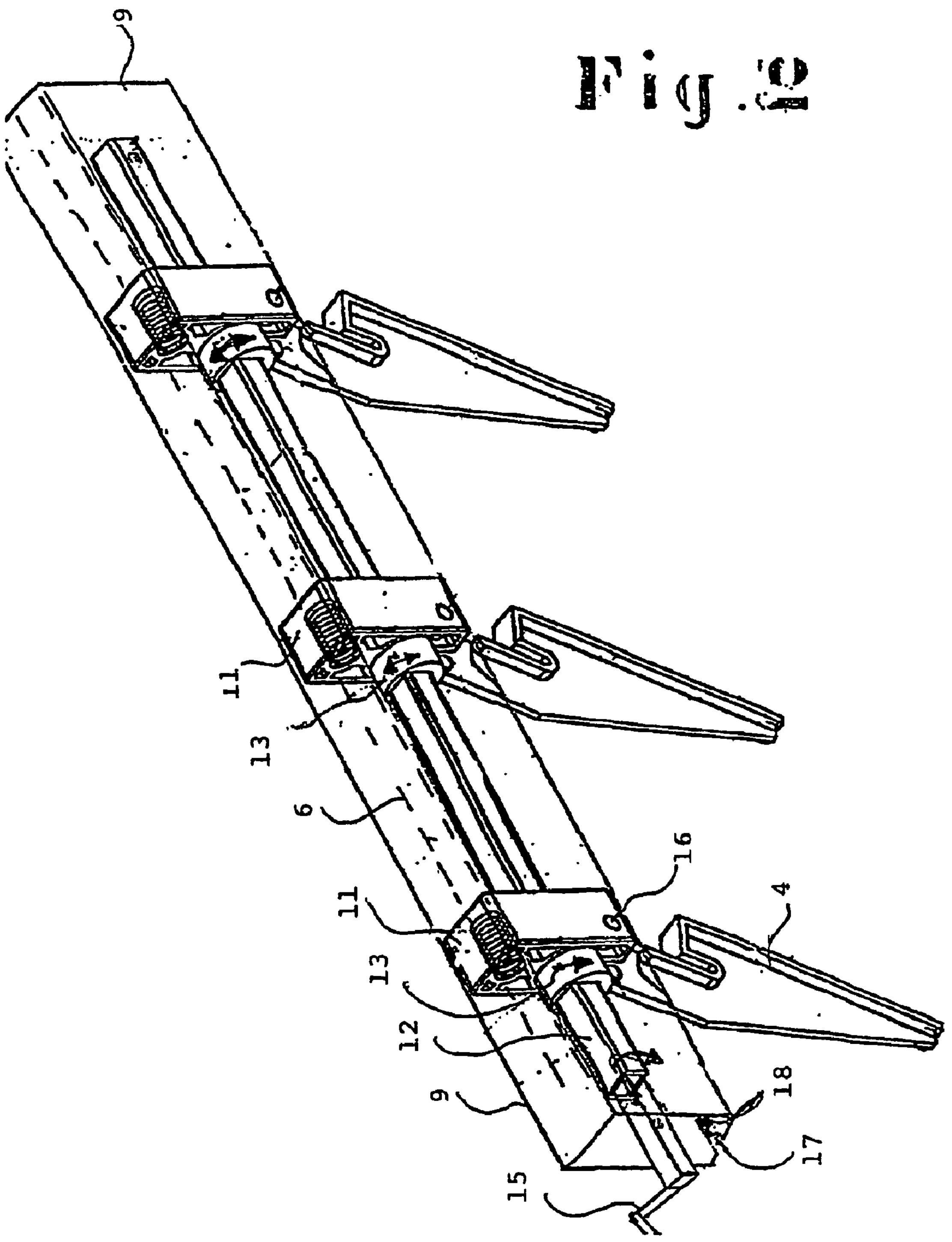
FIG. 2 shows a perspective view of one embodiment of the inventive mechanism for adjusting the angles of the support elements.
Figure 3:
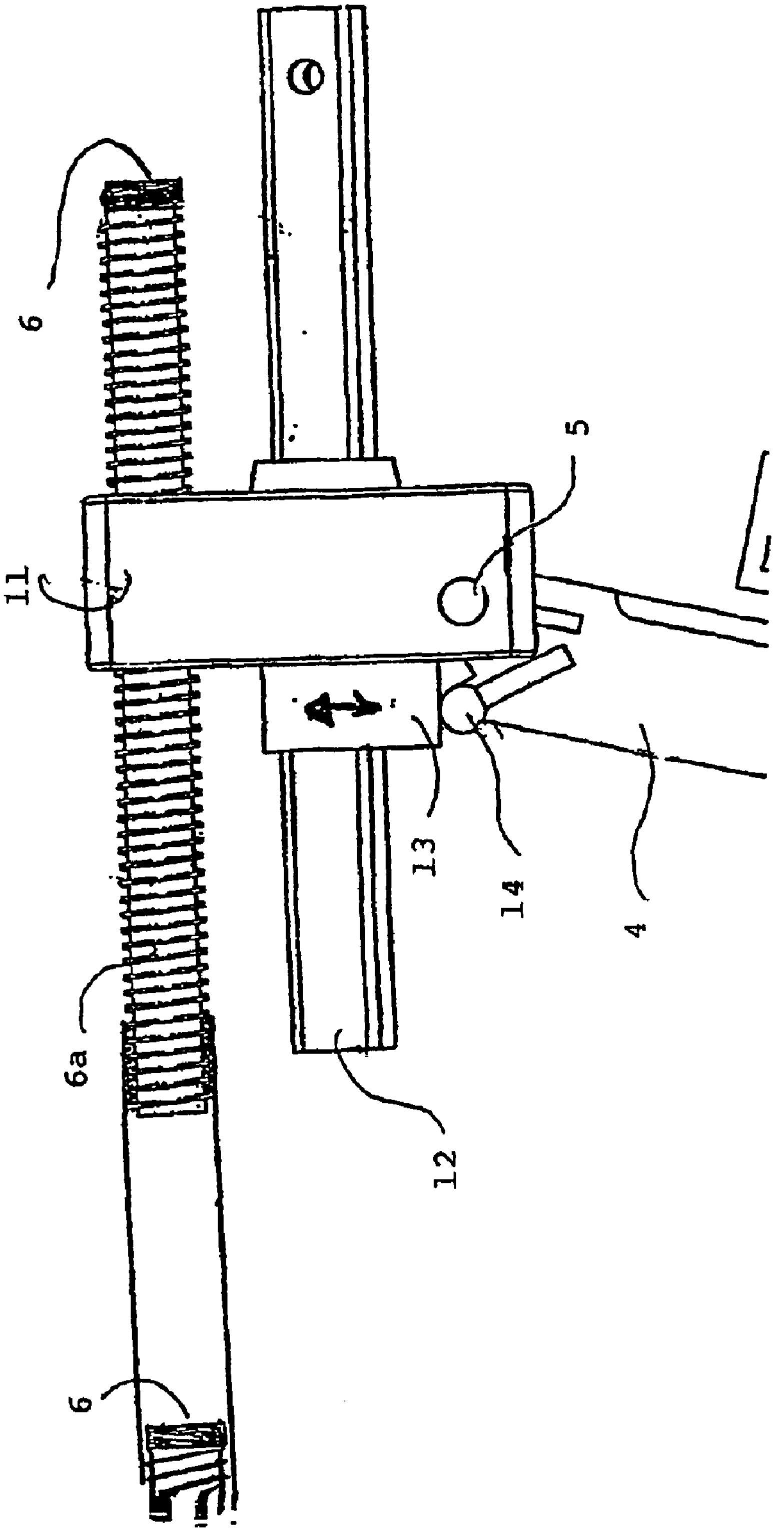
FIG. 3 illustrates a portion of the mechanism of FIG. 2, shown lengthwise in a side view.
Figure 4:
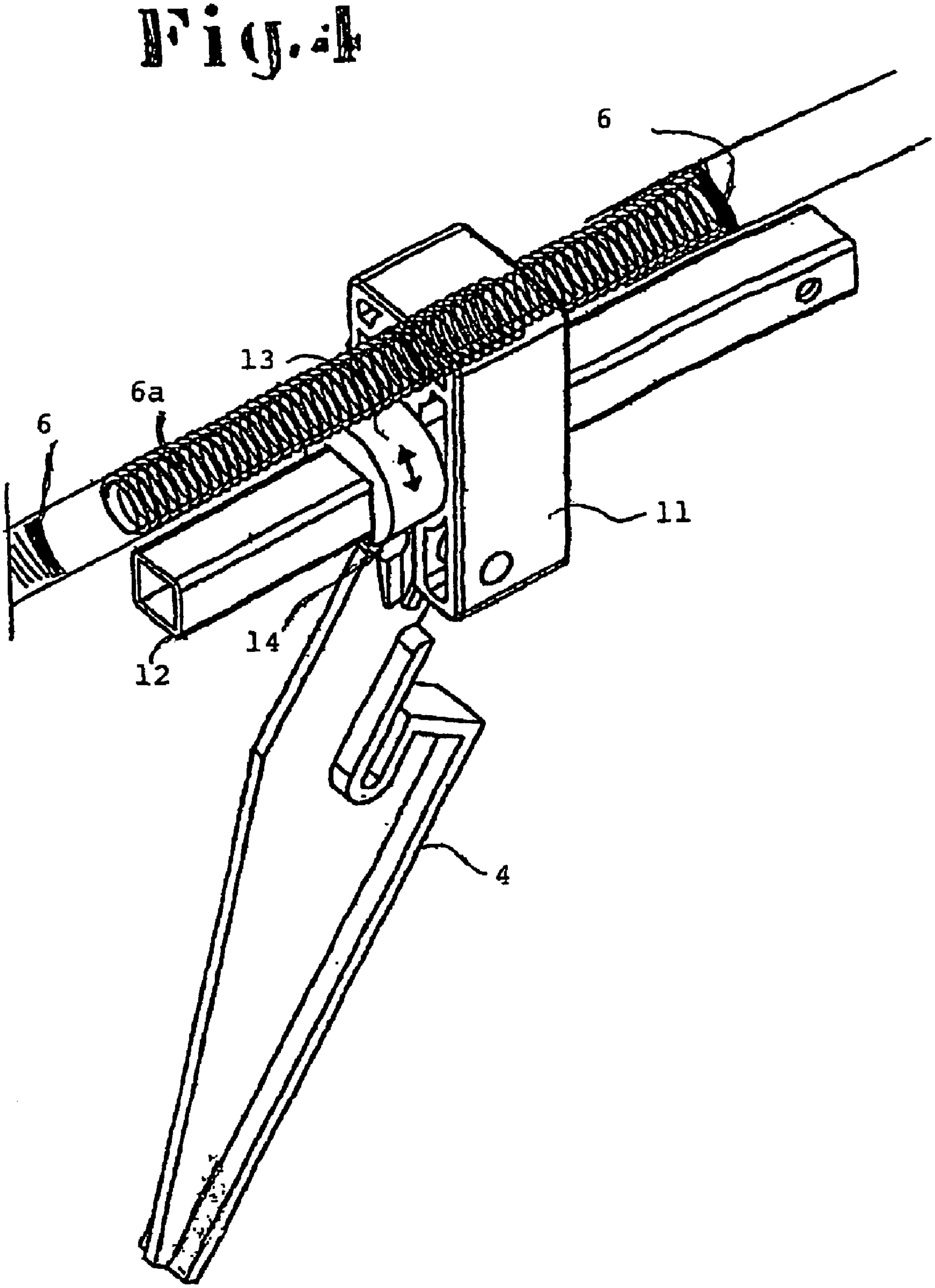
FIG. 4 gives a perspective view of a portion of the mechanism of FIG. 2 with a threaded shaft passing through a block for the adjustment of the variable spacing.

The mechanism illustrated in FIGS. 2 to 4 is designed to allow the simultaneous adjustment of the angles of the step support elements 4 which are known per se and which are designed to rest against the strings of a straight staircase of the type exemplified by the staircases 1, 1*a* and 1*b* in FIG. 1.

This mechanism includes a casing 9 in which at least two interconnected shafts 6 are arranged in nested engagement, spaced at adjustable intervals. This arrangement is known per se and therefore does not need to be described in detail. It is of the kind described in the German utility model 19 34 586.

Each shaft 6 has a threaded portion 6*a* passing through a block 11 that is held captive in the casing 9 and carries a step support element 4. The mechanism has a shaft 12 that runs parallel to the at least two aforementioned shafts 6. The shaft 12 passes through the blocks and is equipped with eccentrics 13, each of which is associated with one of the blocks 11. The eccentrics 13 are constrained on the shaft 12 to share the rotation of the shaft, and each eccentric interacts with the step support element 4 that is associated with the same block 11, so that by pushing against a cam-follower head 14 of the support element 4, the eccentric sets the support element 4 to a predetermined slope angle A, A1, A2, which represents the angle of the staircase to be built.

The shaft 12 passes through all of the eccentrics 13 and is profiled so that the eccentrics 13 are taken along by a rotation of the shaft 12 and each eccentric 13 will turn in its respective block 11, driven by an actuating means 15 that is provided at one end of the shaft 12, for example a hand crank.

Each support element 4 is pivotally joined to its respective block 11 by a transverse axle pin 16 to allow an angular swivel movement of the support element 4 in the longitudinal direction.

The bottom wall of the casing 9 has a lengthwise slot 17 through which the adjustable step support elements 4 protrude to the outside. The slot 17 is closed off by a seal 18 with elastic lips to provide passage openings (not visible in the drawing) for the support elements.

The mechanism according to the invention offers an advantageous way of adjusting the variable distance intervals between the shafts 6 and of adjusting the angles A, A1, A2 of the support elements 4 that determine the position of the risers.

The casing 9 can be fixed on a wall plate (not shown in the drawing) which defines the beginning of the stair steps, and simultaneously on another wall plate that defines the end of the stair steps. The wall plates are configured to hold the base of one casing and on the other hand to hold a second casing at any place within its length.

The invention has numerous other uses besides making the steps of straight staircases, and it is amenable to diverse variations in its reduction to practice.

What is claimed is:

1. A mechanism for simultaneous angle adjustment of support elements relating to stair steps, said mechanism being part of a mold structure for a straight staircase and comprising a casing in which at least two interdependent shafts are arranged, each extending into the next of said interdependent shafts in a nested configuration where the successive intervals between the interdependent shafts are adjustable, and wherein each of said interdependent shafts has a threaded portion traversing an internally threaded block that is located in the casing and holds one of the support elements, said mechanism further comprising a rotatable shaft running parallel to said at least two interdependent shafts, said rotatable shaft passing through the blocks and being equipped with eccentrics, each of said eccentrics being respectively associated with one of the blocks, said eccentrics being constrained to share a rotation of said rotatable shaft, wherein the eccentric of each block interacts with the support element that is associated with said block, so that by pushing against the support element, the eccentric sets the support element to a predetermined slope angle (A).

2. The mechanism according to claim 1, wherein the rotatable shaft passes through all of the eccentrics and is profiled so that the eccentrics are taken along by the rotation of the shaft and each eccentric will turn in its respective block, driven by an actuating means that is provided at one end of the rotatable shaft.

3. The mechanism according to claim 1, wherein each support element is pivotally joined to its respective block by a transverse axle pin to allow an angular swivel movement of the support element in the longitudinal direction.

4. The mechanism according to claim 1, wherein each of said eccentrics interacts with a cam-follower head of the support element, so that by pushing against the cam-follower head, the eccentric sets the support element to a predetermined slope angle.

5. The mechanism according to claim 1, wherein the casing has a lengthwise slot through which the adjustable support elements protrude to the outside, wherein the slot is closed off by a seal with elastic lips to provide passage openings for said support elements.

* * * * *